(12) United States Patent
Zhang

(10) Patent No.: US 12,287,768 B2
(45) Date of Patent: Apr. 29, 2025

(54) DATABASE PERFORMANCE TUNING METHOD, APPARATUS, AND SYSTEM, DEVICE, AND STORAGE MEDIUM

(71) Applicant: TENCENT TECHNOLOGY (SHENZHEN) COMPANY LIMITED, Shenzhen (CN)

(72) Inventor: Ji Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1008 days.

(21) Appl. No.: 17/332,948

(22) Filed: May 27, 2021

(65) Prior Publication Data
US 2021/0286786 A1 Sep. 16, 2021

Related U.S. Application Data

(63) Continuation of application No. PCT/CN2020/081613, filed on Mar. 27, 2020.

(30) Foreign Application Priority Data

Apr. 11, 2019 (CN) .......................... 201910290722.8

(51) Int. Cl.
*G06F 16/21* (2019.01)
*G06N 3/04* (2023.01)
(Continued)

(52) U.S. Cl.
CPC ............. *G06F 16/217* (2019.01); *G06N 3/04* (2013.01); *G06N 3/08* (2013.01); *G06N 20/00* (2019.01)

(58) Field of Classification Search
CPC ............. G06F 16/217; G06F 16/24545; G06F 11/3409; G06F 17/18; G06F 11/302;
(Continued)

(56) References Cited

U.S. PATENT DOCUMENTS 8,782,341 B1 7/2014 Niranjan et al.
9,792,397 B1 10/2017 Nagaraja
(Continued)

FOREIGN PATENT DOCUMENTS

CA 3066775 A1 * 4/2019 ............. G06F 18/00
CA 2901477 C * 7/2023 ............. G02B 27/02
(Continued)

OTHER PUBLICATIONS

China National Intellectual Property Administration (CNIPA) Office Action 1 for 201910290722.8 Oct. 28, 2023 12 Pages (including translation).

(Continued)

*Primary Examiner* — Steven P Sax
(74) *Attorney, Agent, or Firm* — ANOVA LAW GROUP, PLLC

(57) ABSTRACT

A database performance tuning method is provided, including: receiving a performance tuning request of tuning a configuration parameter of a target database; obtaining a status indicator of the target database; and inputting the status indicator of the target database into a deep reinforcement learning model, and outputting a recommended configuration parameter of the target database. The deep reinforcement learning model includes a first deep reinforcement learning network and a second deep reinforcement learning network. The first deep reinforcement learning network is configured to provide a recommendation policy for outputting a recommended configuration parameter according to a status indicator, and the second deep reinforcement learning network is configured to evaluate the recommendation policy provided by the first deep reinforcement learning network.

13 Claims, 11 Drawing Sheets

(51) Int. Cl.
*G06N 3/08* (2023.01)
*G06N 20/00* (2019.01)

(58) Field of Classification Search
CPC .. G06N 3/04; G06N 3/08; G06N 5/01; G06N 3/044; G06N 3/084; G06N 3/048; G06N 20/20; G06N 20/00; G06N 3/045; B25J 9/163; G05B 2219/40499; H04L 67/10; H04L 41/16; H04L 41/14; H04L 41/046; H04L 12/66; G06Q 30/0283
See application file for complete search history.

(56) References Cited

U.S. PATENT DOCUMENTS

| | | | | |
|---|---|---|---|---|
| 10,700,935 | B1 * | 6/2020 | Mousavi | G06N 20/00 |
| 10,926,408 | B1 * | 2/2021 | Vogelsong | B25J 9/163 |
| 11,061,902 | B2 * | 7/2021 | Idicula | G06N 5/01 |
| 11,138,266 | B2 * | 10/2021 | Ding | G06F 16/906 |
| 11,501,202 | B1 * | 11/2022 | Stefani | G06F 16/9038 |
| 11,507,626 | B2 | 11/2022 | Xing et al. | |
| 2017/0116497 | A1 * | 4/2017 | Georgescu | G06N 3/006 |
| 2018/0082213 | A1 * | 3/2018 | McCord | G06N 7/01 |
| 2018/0336493 | A1 * | 11/2018 | Hayes | G06N 7/01 |
| 2018/0351816 | A1 * | 12/2018 | Li | H04L 67/10 |
| 2020/0013411 | A1 * | 1/2020 | Kumar | G10L 17/24 |
| 2020/0034749 | A1 * | 1/2020 | Kumar | G06F 16/24749 |
| 2020/0097388 | A1 * | 3/2020 | Bhat | G06F 11/3608 |
| 2020/0230857 | A1 * | 7/2020 | Bonada Bo | B29C 45/76 |
| 2020/0273120 | A1 * | 8/2020 | Kirihara | G06Q 50/06 |
| 2020/0274894 | A1 * | 8/2020 | Argoeti | H04L 63/1433 |
| 2020/0293503 | A1 * | 9/2020 | P | G06N 5/04 |
| 2020/0302234 | A1 * | 9/2020 | Walters | G06F 16/9035 |
| 2020/0394226 | A1 | 12/2020 | Xing et al. | |

FOREIGN PATENT DOCUMENTS

| | | | | | |
|---|---|---|---|---|---|
| CN | 103853786 | A | | 6/2014 | |
| CN | 107844837 | A | | 3/2018 | |
| CN | 108763398 | A | * | 11/2018 | ........... G06F 16/217 |
| CN | 108803321 | A | * | 11/2018 | ........... G05B 13/042 |
| CN | 109101712 | A | * | 12/2018 | ............. G06F 30/20 |
| CN | 109308246 | A | | 2/2019 | |
| CN | 109344201 | A | | 2/2019 | |
| CN | 109379752 | A | | 2/2019 | |
| CN | 109412829 | A | | 3/2019 | |
| CN | 110019151 | A | | 7/2019 | |
| CN | 109284606 | B | * | 8/2019 | ............. G06F 21/55 |
| CN | 107613315 | B | * | 5/2020 | |
| CN | 109471847 | B | * | 6/2020 | |
| CN | 111353091 | A | * | 6/2020 | ......... G06F 16/9535 |
| DE | 102017006687 | B4 | * | 6/2023 | ............. G07C 3/143 |
| EP | 3447660 | A1 | * | 2/2019 | ......... G06F 11/0703 |
| JP | 2018151876 | A | * | 9/2018 | |
| JP | 2020520516 | A | * | 7/2020 | |
| JP | 2020156053 | A | * | 9/2020 | ............... G01N 3/08 |
| JP | 2021515479 | A | * | 6/2021 | |
| WO | WO-2018223123 | A1 | * | 12/2018 | ........... G06N 99/005 |
| WO | 2019019926 | A1 | | 1/2019 | |
| WO | WO-2020209826 | A1 | * | 10/2020 | ............ G06K 9/6263 |

OTHER PUBLICATIONS

The World Intellectual Property Organization (WIPO) International Search Report for PCT/CN2020/081613 Jun. 30, 2020 7 Pages (including translation).

* cited by examiner

| Step | Actor network | | Critic network | |
|---|---|---|---|---|
| | Layer | Parameter | Layer | Parameter |
| 1 | Input layer | 63 | Input layer | #Quantity of parameters+63 |
| 2 | Fully connected layer | 128 | Parallel fully connected layer | 128+128 |
| 3 | Activation function ReLU layer | 0.2 | Fully connected layer | 256 |
| 4 | BatchNorm layer | 16 | Activation function ReLU layer | 0.2 |
| 5 | Fully connected layer | 128 | BatchNorm layer | 16 |
| 6 | Activation function Tanh layer | - | Fully connected layer | 256 |
| 7 | Dropout layer | 0.3 | Fully connected layer | 64 |
| 8 | Fully connected layer | 128 | Activation function Tanh layer | - |
| 9 | Activation function Tanh layer | - | Dropout layer | 0.3 |
| 10 | Fully connected layer | 64 | BatchNorm layer | 16 |
| 11 | Output layer | #Quantity of parameters | Output layer | 1 |

FIG. 5

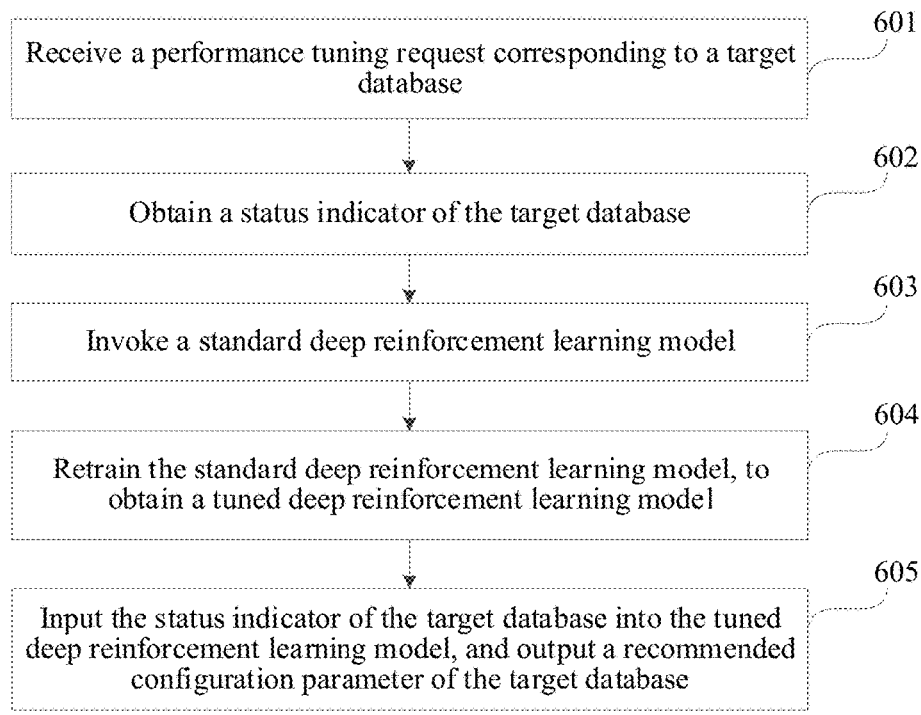

FIG. 6

DATABASE PERFORMANCE TUNING METHOD, APPARATUS, AND SYSTEM, DEVICE, AND STORAGE MEDIUM

CROSS-REFERENCES TO RELATED APPLICATIONS

This application is a continuation application of PCT Patent Application No. PCT/CN2020/081613, entitled "DATABASE PERFORMANCE ADJUSTMENT METHOD AND APPARATUS, DEVICE, SYSTEM, AND STORAGE MEDIUM" and filed on Mar. 27, 2020, which claims priority to Chinese Patent Application No. 2019102907228, entitled "DATABASE PERFORMANCE TUNING METHOD, APPARATUS, AND SYSTEM, DEVICE, AND STORAGE MEDIUM" filed with the China National Intellectual Property Administration on Apr. 11, 2019, both of which are incorporated by reference in their entirety.

FIELD OF THE TECHNOLOGY

Embodiments of the present disclosure relate to the field of database technologies, and in particular, to a database performance tuning method, apparatus, and system, a device, and a storage medium.

BACKGROUND OF THE DISCLOSURE

With the rapid development of cloud computing, small and mid-sized enterprises purchase cloud database (CDB) systems from cloud service providers. However, most users only stay at the use level after purchasing the CDB systems. During use, the performance of the CDB systems degrades, and it is difficult for the users to find problems that cause the degradation of the performance of the CDB systems and resolve the problems effectively and quickly due to the lack of experience in database management and tuning.

For a cloud service provider with hundreds of thousands of users, it is obviously impractical to rely entirely on database administrators (DBA) to tune the performance of instances of CDB systems. In the related art, a database performance tuning tool named OtterTune is provided. OtterTune is a tool that implements database performance tuning by using a model-based method, and OtterTune collects, processes, analyzes, and recommends possible database configurations based on a large amount of empirical data of historical DBA parameter tuning by using a machine learning pipeline method, to improve the performance of a database.

Because OtterTune adopts a learning pipeline method, an optimal solution in a former stage does not ensure an optimal solution in a later stage. As a result, different stages of a model may fail to cooperate adequately with each other, and consequently the model provides poor recommended configuration parameters, leading to a poor database performance tuning result.

SUMMARY

According to various embodiments provided in the present disclosure, a database performance tuning method, apparatus, and system, a device, and a storage medium are provided. The technical solutions are as follows:

A database performance tuning method is provided, performed by a computer device, the method including: receiving a performance tuning request of tuning a configuration parameter of a target database; obtaining a status indicator of the target database; and inputting the status indicator of the target database into a deep reinforcement learning model, and outputting a recommended configuration parameter of the target database. The deep reinforcement learning model includes a first deep reinforcement learning network and a second deep reinforcement learning network. The first deep reinforcement learning network is configured to provide a recommendation policy for outputting a recommended configuration parameter according to a status indicator, and the second deep reinforcement learning network is configured to evaluate the recommendation policy provided by the first deep reinforcement learning network.

A database performance tuning system is provided, including: a database system, a controller, and a tuning tool, the tuning tool including: an indicator collector, a deep reinforcement learning model, and a recommender; the controller being configured to: receive a performance tuning request corresponding to a target database in the database system, the performance tuning request being used for requesting to tune a configuration parameter of the target database to optimize performance of the target database; and forward the performance tuning request to the tuning tool; the tuning tool being configured to: obtain a status indicator of the target database by using the indicator collector; output a recommended configuration parameter of the target database according to the status indicator of the target database by using the deep reinforcement learning model; and transmit the recommended configuration parameter of the target database to the controller by using the recommender, the deep reinforcement learning model including a first deep reinforcement learning network and a second deep reinforcement learning network, the first deep reinforcement learning network being configured to provide a recommendation policy for outputting a recommended configuration parameter according to a status indicator, the second deep reinforcement learning network being configured to evaluate the recommendation policy provided by the first deep reinforcement learning network; the controller being further configured to apply the recommended configuration parameter of the target database to the target database.

A database performance tuning apparatus is provided, disposed in a computer device, the apparatus including: a request receiving module, configured to receive a performance tuning request corresponding to a target database, the performance tuning request being used for requesting to tune a configuration parameter of the target database to optimize performance of the target database; an indicator obtaining module, configured to obtain a status indicator of the target database; and a parameter recommendation module, configured to: input the status indicator of the target database into a deep reinforcement learning model to obtain a recommended configuration parameter of the target database, the deep reinforcement learning model including a first deep reinforcement learning network and a second deep reinforcement learning network, the first deep reinforcement learning network being configured to provide a recommendation policy for outputting a recommended configuration parameter according to a status indicator, the second deep reinforcement learning network being used configured to evaluate the recommendation policy provided by the first deep reinforcement learning network.

A computer device is provided, including one or more processors and a memory, the memory storing at least one computer-readable instruction, at least one program, a code set, or a computer-readable instruction set, the at least one computer-readable instruction, the at least one program, the code set, or the computer-readable instruction set being loaded and executed by the one or more processors to implement: receiving a performance tuning request of tuning a configuration parameter of a target database; obtaining a status indicator of the target database; and inputting the status indicator of the target database into a deep reinforcement learning model, and outputting a recommended configuration parameter of the target database. The deep reinforcement learning model includes a first deep reinforcement learning network and a second deep reinforcement learning network. The first deep reinforcement learning network is configured to provide a recommendation policy for outputting a recommended configuration parameter according to a status indicator, and the second deep reinforcement learning network is configured to evaluate the recommendation policy provided by the first deep reinforcement learning network.

A non-transitory computer-readable storage medium is provided, storing at least one computer-readable instruction, at least one program, a code set, or a computer-readable instruction set, the at least one computer-readable instruction, the at least one program, the code set, or the computer-readable instruction set being loaded and executed by the one or more processors to implement: receiving a performance tuning request of tuning a configuration parameter of a target database; obtaining a status indicator of the target database; and inputting the status indicator of the target database into a deep reinforcement learning model, and outputting a recommended configuration parameter of the target database. The deep reinforcement learning model includes a first deep reinforcement learning network and a second deep reinforcement learning network. The first deep reinforcement learning network is configured to provide a recommendation policy for outputting a recommended configuration parameter according to a status indicator, and the second deep reinforcement learning network is configured to evaluate the recommendation policy provided by the first deep reinforcement learning network.

Details of one or more embodiments of the present disclosure are provided in the accompanying drawings and descriptions below. Other features, objectives, and advantages of the present disclosure become more obvious based on the specification, the accompanying drawings, and the claims.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

FIG. 5 exemplarily shows a schematic diagram of parameters of layers of an actor-critic network.

FIG. 6 is a flowchart of a database performance tuning method according to another embodiment of the present disclosure.

DESCRIPTION OF EMBODIMENTS

To make the objectives, technical solutions, and advantages of the present disclosure clearer, implementations of the present disclosure are further described below in detail with reference to the accompanying drawings. It is to be understood that the specific implementations described herein are only used to describe the present disclosure, instead of limiting the present disclosure.

Figure 1:
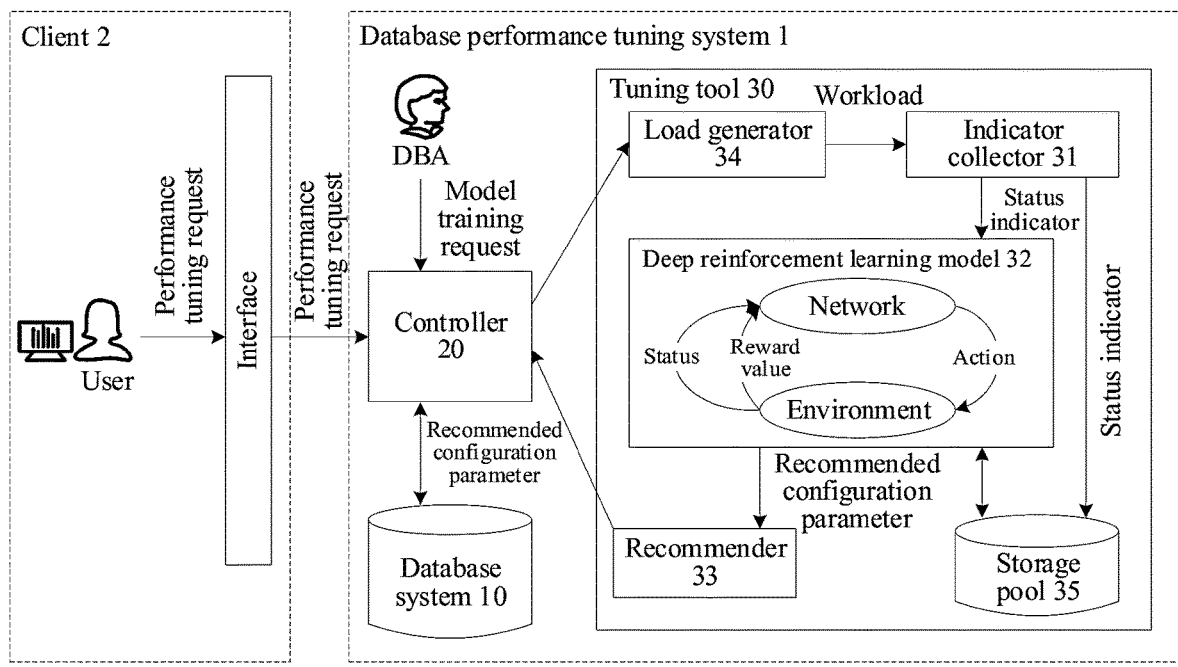
FIG. 1 is a schematic diagram of a database performance tuning system according to an embodiment of the present disclosure.

FIG. 1 is a schematic diagram of a database performance tuning system according to an embodiment of the present disclosure. The database performance tuning system 1 may include a database system 10, a controller 20, and a tuning tool 30.

The database system 10 is a system configured to provide a data storage service. In an exemplary embodiment, the database system 10 is a CDB system. The CDB system may be established by a cloud service provider and usually includes a plurality of database instances for providing database services to different users.

The controller 20 is configured to exchange information between a client 2, the database system 10, and the tuning tool 30. For example, when a user initiates a performance tuning request for any database instance in the database system 10 by using the client 2, the client 2 may transmit the performance tuning request to a server through a local interface, that is, transmit the performance tuning request to the controller 20 in the database performance tuning system 1, and the controller 20 is responsible for processing the performance tuning request. In addition, the controller 20 is further configured to receive a model training request initiated by a DBA, and is responsible for processing the model training request, the model training request being used for requesting to train a deep reinforcement learning model 32 in the tuning tool 30. A function of the controller 20 may be implemented by one or more computer devices.

The tuning tool 30 is configured to perform performance tuning on the database instances in the database system 10. In one embodiment of the present disclosure, the tuning tool 30 implements an end-to-end database performance tuning solution based on the deep reinforcement learning model 32. In an exemplary embodiment, when the database system 10 is the CDB system, the tuning tool 30 may be referred to as a database intelligent performance tuning tool, for example, CDBTune. A function of the tuning tool 30 may be implemented by one or more computer devices.

In an exemplary embodiment, the tuning tool 30 includes: an indicator collector 31, a deep reinforcement learning model 32, and a recommender 33.

The indicator collector 31 is configured to collect a status indicator of a to-be-tuned database instance. The status indicator is used for indicating a running state of the database instance and may be obtained through a "show status" command. The indicator collector 31 may be a computer device, or may be a functional module in a computer device.

The deep reinforcement learning model 32 is a model obtained through training through deep reinforcement learning and implements the end-to-end database performance tuning solution. The status indicator of the to-be-tuned database instance is inputted into the deep reinforcement learning model 32, and the deep reinforcement learning model 32 may output a recommended configuration parameter of the to-be-tuned database instance. In an exemplary embodiment, the deep reinforcement learning model 32 adopts an actor-critic model architecture. For specific introduction and description of the actor-critic model architecture, reference may be made to the following embodiments.

The recommender 33 is configured to transmit the recommended configuration parameter outputted by the deep reinforcement learning model 32 to the controller 20, and the controller 20 applies the recommended configuration parameter to the to-be-tuned database instance. The recommender 33 may be a computer device, or may be a functional module in a computer device.

In an exemplary embodiment, as shown in FIG. 1, the tuning tool 30 further includes a load generator 34. The load generator 34 is configured to simulate a workload or replay a real workload of a user, to improve recommendation accuracy of the deep reinforcement learning model 32. The load generator 34 may be a computer device, or may be a functional module in a computer device.

In an exemplary embodiment, as shown in FIG. 1, the tuning tool 30 further includes a storage pool 35. The storage pool 35 is configured to store data used during running of the tuning tool 30. For example, the data includes the status indicator of the to-be-tuned database instance, a performance indicator of the to-be-tuned database instance, and a related parameter of the deep reinforcement learning model 32. The storage pool 35 may be implemented by a storage device with a data storage function.

In one embodiment of the present disclosure, the performing performance tuning on a database is tuning configuration parameters of the database, to optimize the performance of the database.

Figure 2:
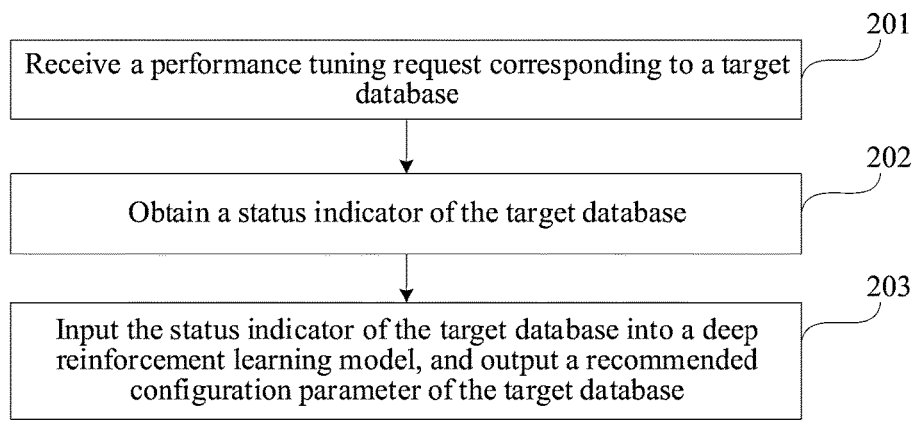
FIG. 2 is a flowchart of a database performance tuning method according to an embodiment of the present disclosure.

FIG. 2 is a flowchart of a database performance tuning method according to an embodiment of the present disclosure. The method may be applicable to the database performance tuning system 1 shown in FIG. 1. For example, steps may be performed by the tuning tool 30. The method may include the following steps (201 to 203):

Step 201. Receive a performance tuning request corresponding to a target database.

The target database may be the database system 10 in FIG. 1. Alternatively, when the database system 10 includes a plurality of database instances, the target database may be any one of the database instances.

The performance tuning request is used for requesting to tune configuration parameters of the target database to optimize performance of the target database. For example, referring to FIG. 1, the performance tuning request may be initiated by the client 2. When a user finds that the performance of the target database degrades, and parameter tuning needs to be performed on the target database to optimize the performance of the target database, the performance tuning request may be transmitted to the controller 20 of the database performance tuning system 1 by using the client 2, and the controller 20 forwards the performance tuning request to the tuning tool 30 for processing.

Step 202. Obtain a status indicator of the target database.

Referring to FIG. 1, the tuning tool 30 may monitor and acquire a status indicator of the target database by using the indicator collector 31, to obtain the status indicator of the target database. The status indicator of the target database is used for indicating a running state of the target database and may be obtained through a "show status" command. For example, the status indicator of the target database includes, but is not limited to, at least one of the following: a quantity of database operations, a quantity of pages including data, a quantity of currently opened tables, a quantity of currently opened files, a quantity of queries in a buffer, a total size of a buffer pool, a total quantity of data reads, a total quantity of data writes, a quantity of read pages, a total quantity of written pages, or the like.

Step 203. Input the status indicator of the target database into a deep reinforcement learning model, and output a recommended configuration parameter of the target database.

Referring to FIG. 1, the tuning tool 30 invokes a deep reinforcement learning model and inputs the status indicator of the target database into the deep reinforcement learning model, and the deep reinforcement learning model outputs the recommended configuration parameter of the target database.

Figure 3:
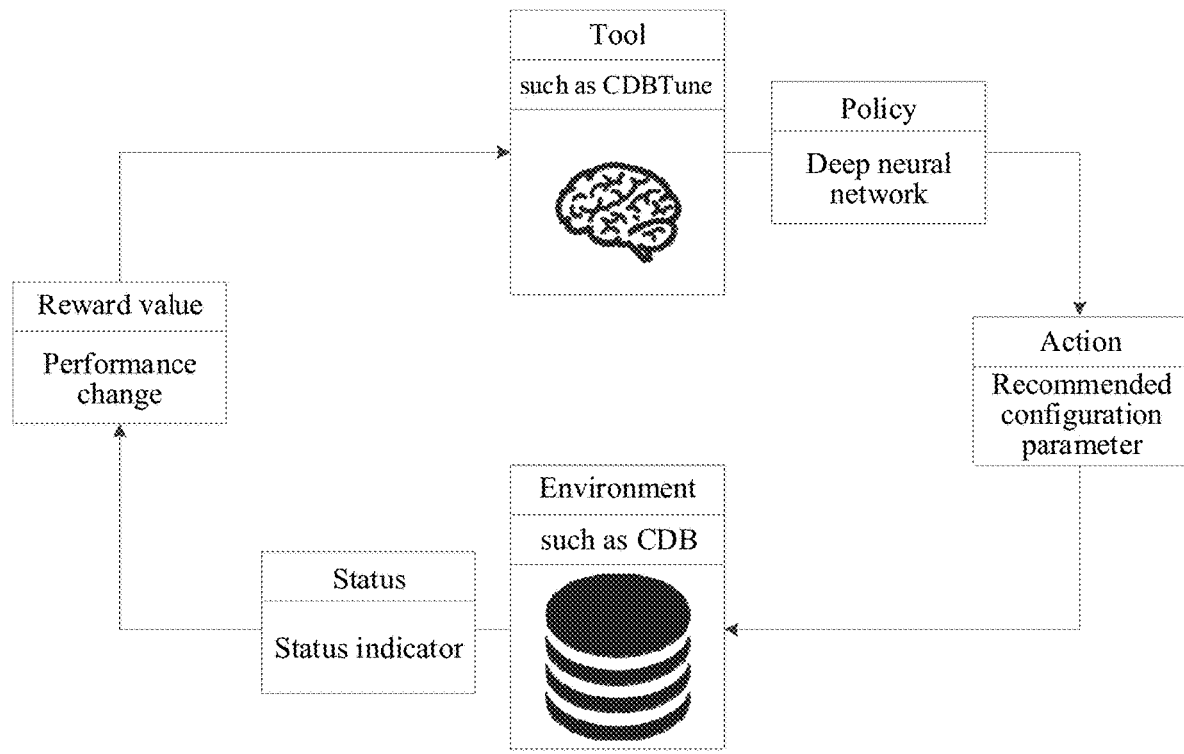
FIG. 3 is a schematic interaction diagram exemplarily showing six key elements in deep reinforcement learning.

To implement the end-to-end database performance tuning solution through deep reinforcement learning, during technology implementation, the database performance tuning solution needs to be mapped to an appropriate operation in the deep reinforcement learning. FIG. 3 exemplarily shows a schematic interaction diagram of six key elements in deep reinforcement learning and shows a correspondence between the six elements and elements in the database performance tuning solution.

An agent corresponds to the tuning tool (for example, CDBTune) described above and is mainly formed by a deep reinforcement learning model. The deep reinforcement learning model may be implemented by a deep neural network. An input parameter of the deep reinforcement learning model is a status indicator of a database, and an output parameter is a recommended configuration parameter of the database. The deep reinforcement learning model is configured to provide a recommendation policy for outputting a recommended configuration parameter according to a status indicator, and a process of training the model is actually a process of tuning the recommendation policy. For example, the recommendation policy is updated (that is, a parameter of the model is tuned) to guide how to tune a configuration of the database to obtain a larger reward value (that is, higher performance).

An environment corresponds to a tuned target, that is, a to-be-tuned target database, for example, a to-be-tuned CDB instance.

A status represents a current running state of the target database and may be obtained through a "show status" command. In an exemplary embodiment, a status of a time t is recorded as $S_t$.

A reward value is a scalar and represents a difference between performance of the target database before the recommended configuration parameter is applied and performance of the target database after the recommended configuration parameter is applied. In an exemplary embodiment, it is assumed that a status indicator of the target database at a time t is $S_t$, a recommended configuration parameter outputted by a deep reinforcement learning model according to $S_t$ is $p_t$, and a reward value obtained after the target database applies $p_t$ may be recorded as $r_t$, representing a change in performance of the target database before and after $p_t$ is applied. In an exemplary embodiment, a performance indicator of the target database includes, but is not limited to, at least one of the following: concurrency, latency, or the like.

An action mainly includes a combination of tunable configuration parameters of the target database. The "action" herein corresponds to a parameter tuning operation. That is, the recommended configuration parameter outputted by the deep reinforcement learning model is applied to the target database. Parameter values of the tunable configuration parameters may be increased, unchanged, or decreased in each parameter tuning process.

A policy defines a behavior of a tuning tool at a specific time and in a specific environment, that is, a mapping relationship between a state and an action. The "policy" herein is actually a deep neural network, an input parameter of the deep neural network is the status indicator of the target database, and an output parameter is the recommended configuration parameter (which is recorded as Knobs) of the target database, including a parameter combination of a database configuration that needs to be executed.

Deep reinforcement learning makes a policy decision in an interaction process between a model and an environment. Different from supervised learning or unsupervised learning, reinforcement learning is that training and learning are performed depending on an accumulated reward instead of a label. An objective of the deep reinforcement learning is to optimize a policy of the deep reinforcement learning based on a return of an environment through continuously interaction with the environment, and a higher return is then obtained by collecting an updated policy. In an exemplary embodiment, modeling is performed by using a deep reinforcement learning method of a deep deterministic policy gradient (DDPG), so that a finally constructed deep reinforcement learning model can provide a database parameter configuration in a high-dimensional continuous space.

In an exemplary embodiment, the deep reinforcement learning model includes a first deep reinforcement learning network and a second deep reinforcement learning network. The first deep reinforcement learning network is used for providing a recommendation policy for outputting a recommended configuration parameter according to a status indicator and the second deep reinforcement learning network is used for evaluating the recommendation policy provided by the first deep reinforcement learning network. For example, an input parameter of the first deep reinforcement learning network includes the status indicator, and an output parameter of the first deep reinforcement learning network includes the recommended configuration parameter. An input parameter of the second deep reinforcement learning network includes the input parameter and the output parameter of the first deep reinforcement learning network, an output parameter of the second deep reinforcement learning network includes a score value, and the score value is used for evaluating the recommendation policy provided by the first deep reinforcement learning network.

Figure 4:
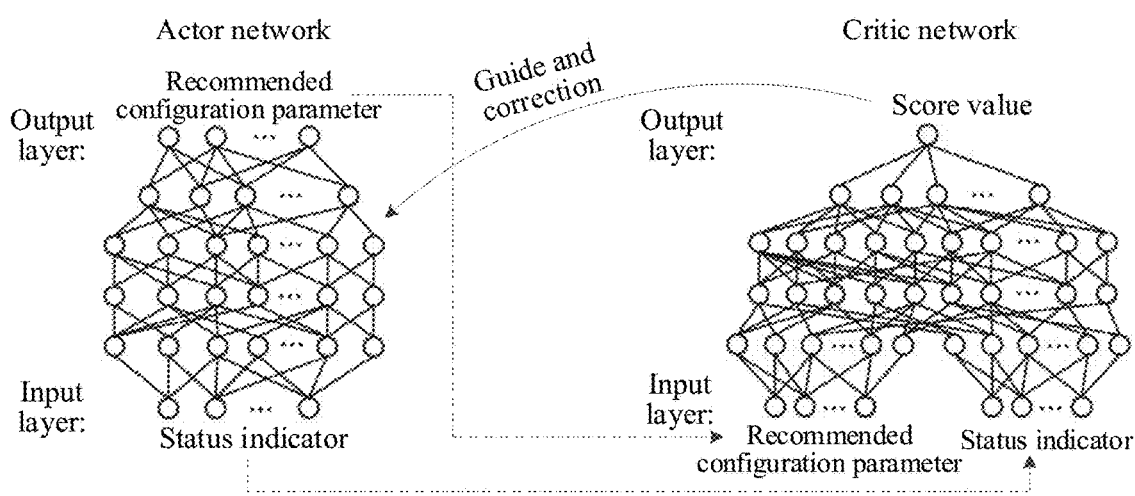
FIG. 4 is a schematic structural diagram exemplarily showing an actor-critic network.

In an exemplary embodiment, the deep reinforcement learning model adopts an actor-critic model architecture, and the actor-critic is a reinforcement learning method. The first deep reinforcement learning network is an actor network, and the second deep reinforcement learning network is a critic network. As shown in FIG. 4, an input parameter of the actor network is a status indicator of a database, and an output parameter is a recommended configuration parameter of the database. An input parameter of the critic network includes two parts. One part is the input parameter (that is, the status indicator of the database) of the actor network, and the other part is the output parameter (the recommended configuration parameter of the database) of the actor network. An output parameter of the critic network is a score value used for representing a "reasonable degree" of an input/output (I/O) combination of the actor network. The actor network is corrected by using the score value, so that the I/O combination of the actor network is more reasonable.

In an exemplary embodiment, the structures of the actor network and the critic network are shown in FIG. 5. FIG. 5 exemplarily shows layers of an actor network and related parameters of the layers and layers of a critic network and related parameters of the layers. The network structure and the parameters shown in FIG. 5 are merely exemplary and interpretive, but do not constitute a limitation to the technical solution of the present disclosure.

In addition, the actor network may select a reinforcement learning algorithm based on an action probability, for example, a policy gradient algorithm, and the critic network may select a value-based reinforcement learning algorithm, for example, a Q learning algorithm.

In summary, in the technical solution provided in the embodiments of the present disclosure, a recommended configuration parameter of a target database is outputted according to a status indicator of the target database by using a deep reinforcement learning model, and an end-to-end database performance tuning solution is provided. Problems of a poor recommended configuration parameter and a poor database performance tuning result caused by a machine learning pipeline method are overcome. The problems caused by a pipeline solution can be overcome because of the end-to-end solution, thereby improving the accuracy of the recommended configuration parameter and achieving a better performance tuning result of a database.

In addition, in the technical solution provided in the embodiments of the present disclosure, the deep reinforcement learning model directly outputs a recommended configuration parameter of a target database, and then directly applies the recommended configuration parameter to the target database. Compared with a solution in which tuned data such as increased data, decreased data, or unchanged data is outputted by a model and a user then determines a tuned configuration parameter according to the tuned data and an original configuration parameter, the technical solution provided in the embodiments of the present disclosure is simpler without the step of determining a tuned configuration parameter according to tuned data and an original configuration parameter by a user and is more accurate. The tuned configuration parameter determined by the user according to the tuned data and the original configuration parameter is not necessarily accurate, and because the user cannot accurately grasp a tuning amount and it is likely that the tuning amount is excessively large or small, database performance cannot be tuned to the best. However, the problem can be avoided when the model directly outputs the recommended configuration parameter.

In addition, in the technical solution provided in the embodiments of the present disclosure, a deep reinforcement learning model adopts an actor-critic model architecture. Compared with modeling using a Q learning algorithm or a policy gradient algorithm alone, the actor-critic model architecture can have the following two advantages: 1. An actor network of an actor-critic model can find recommended parameters from continuous variables by selecting a reinforcement learning algorithm based on an action probability, for example, the policy gradient algorithm. Because most configuration parameters of a database are continuous variables, the actor-critic model is more suitable for recommendation of the configuration parameters of the database. 2. A critic network of the actor-critic model can perform, instead of round updating, single-step updating by selecting the Q learning algorithm or another value-based reinforcement learning algorithm, thereby achieving higher learning efficiency of the model.

FIG. 6 is a flowchart of a database performance tuning method according to another embodiment of the present disclosure. The method may be applicable to the database performance tuning system 1 shown in FIG. 1. For example, steps may be performed by the tuning tool 30. The method may include the following steps (601 to 605):

Step 601. Receive a performance tuning request corresponding to a target database.

Step 602. Obtain a status indicator of the target database.

Step 601 and step 602 are the same as step 201 and step 202 in the embodiment of FIG. 2. For details, reference is made to the introduction and description in the embodiment of FIG. 2. Details are not described herein again.

Step 603. Invoke a standard deep reinforcement learning model.

The standard deep reinforcement learning model is obtained through training by using standard database instances. The standard database instances are some preselected database instances rather than database instances actually used by a user.

Step 604. Retrain the standard deep reinforcement learning model, to obtain a tuned deep reinforcement learning model.

In one embodiment of the present disclosure, when a tuning tool provides the recommended configuration parameter to the target database, instead of directly using the standard deep reinforcement learning model, the tuning tool first retrains the standard deep reinforcement learning model, to obtain the tuned deep reinforcement learning model. The tuned deep reinforcement learning model is used for providing the recommended configuration parameter of the target database. Because the tuned deep reinforcement learning model has learned a feature of the target database, the recommended configuration parameter of the target database provided by the tuned deep reinforcement learning model is more accurate.

In an exemplary embodiment, this step includes the following sub-steps.

1. Replay an actual workload of the target database.

Replaying a real workload of the target database means that a statement executed by the target database within a historical time is re-executed, to review a historical working condition of the target database. In some embodiments, replaying the actual workload of the target database may include: obtaining an operation execution record of the target database; returning the target database to a state at a previous timestamp; and re-executing a plurality of operations logged in the operation execution record starting from the previous timestamp according to a same execution sequence logged operation execution record. Referring to FIG. 1, the tuning tool 30 replays the actual workload of the target database by using the load generator 34. For example, an actual workload of the target database within a latest time period is replayed, and the latest time period may be preset according to an actual requirement, for example, preset to 30 minutes, one hour, 12 hours, or one day. The load generator 34 may replay the actual workload of the target database within the latest time period according to log information of the target database. For example, the log information records that the target database has executed a plurality of structured query language (SQL) statements within the last one hour. The load generator 34 controls the target database to return to a state one hour ago, and the target database then re-executes the plurality of SQL statements, and an execution time and an execution sequence of each SQL statement are the same as those in the case recorded in the log information, thereby replaying the actual workload.

2. Perform at least one round of retraining process on the standard deep reinforcement learning model in a process of running the target database according to the actual workload.

In an exemplary embodiment, the deep reinforcement learning model includes the first deep reinforcement learning network and the second deep reinforcement learning network described above. The performing at least one round of retraining process on the standard deep reinforcement learning model may include the following steps:

2.1. Obtain an $i^{th}$ round of status indicator of the target database in an $i^{th}$ round of retraining process, i being a positive integer.

2.2. Input the $i^{th}$ round of status indicator into the first deep reinforcement learning network, and output an $i^{th}$ round of recommended configuration parameter of the target database.

2.3. Apply the $i^{th}$ round of recommended configuration parameter to the target database.

2.4. Input the $i^{th}$ round of status indicator and the $i^{th}$ round of recommended configuration parameter into the second deep reinforcement learning network, and output the score value corresponding to the first deep reinforcement learning network.

2.5. Tune a parameter of the first deep reinforcement learning network according to the score value, to increase a reward value corresponding to the first deep reinforcement learning network.

The reward value is used for indicating a difference between performance of the target database before the $i^{th}$ round of recommended configuration parameter is applied and performance of the target database after the $i^{th}$ round of recommended configuration parameter is applied. In an exemplary embodiment, after the $i^{th}$ round of recommended configuration parameter is applied to the target database, the $i^{th}$ round of performance indicator of the target database is collected, and a reward value corresponding to the first deep reinforcement learning network is calculated according to the $i^{th}$ round of performance indicator.

In one embodiment of the present disclosure, a model is trained by using a reward feedback mechanism in reinforcement learning instead of a regression method in conventional machine learning. In this way, end-to-end learning can be implemented, and a convergence speed of the model is accelerated, thereby improving the efficiency of a retraining process.

3. Stop training (retraining) the standard deep reinforcement learning model when the currently re-trained standard deep reinforcement learning model meets a training stop condition, to obtain the tuned deep reinforcement learning model.

The training stop condition may be preset. For example, a quantity of rounds of performing the retraining process reaches a preset quantity of rounds, execution duration of the retraining process reaches preset duration, or recommendation precision of a model reaches preset precision. This is not limited in this embodiment of the present disclosure.

Step 605. Input the status indicator of the target database into the tuned deep reinforcement learning model, and output a recommended configuration parameter of the target database.

Referring to FIG. 1, after retraining the standard deep reinforcement learning model to obtain the tuned deep reinforcement learning model, the tuning tool 30 inputs the status indicator of the target database into the tuned deep reinforcement learning model, and the tuned deep reinforcement learning model outputs the recommended configuration parameter of the target database.

A process of obtaining the standard deep reinforcement learning model through training by using the standard database instance is similar to the retraining process described above, and details are not described again in the embodiments of the present disclosure. In addition, a conventional machine learning method depends on a large amount of high quality training data. It is difficult to obtain such data in a real environment. When a model is trained by using a deep reinforcement learning method, the model that can recommend an appropriate database configuration parameter may be trained by using a small quantity of limited samples in a trial-and-error manner.

In summary, in the technical solution provided in the embodiments of the present disclosure, a standard deep reinforcement learning model is further retrained, to obtain a tuned deep reinforcement learning model, and a recommended configuration parameter of a target database is then outputted by the tuned deep reinforcement learning model. Because the tuned deep reinforcement learning model has learned a load feature of the target database, the recommended configuration parameter of the target database provided by the tuned deep reinforcement learning model is more accurate.

For example, a database system is a CDB system, and the tuning tool described above is referred to as CDBTune. A test is performed by using different experimental loads and different database instances, and main experimental results are as follows:

1. Efficiency Comparison (1) In terms of an execution time: CDBTune takes about 25 minutes for one parameter tuning process. OtterTune takes about 55 minutes, and DBA takes 8.6 hours. CDBTune needs to perform offline training to obtain the standard deep reinforcement learning model described above, but such offline training is performed once. During online recommendation, only the standard deep reinforcement learning model needs to be retrained. That is, the standard deep reinforcement learning model is tuned slightly, so that the standard deep reinforcement learning model is suitable for a to-be-tuned target database, to obtain a better recommended configuration parameter and a performance tuning result.

Figure 7:
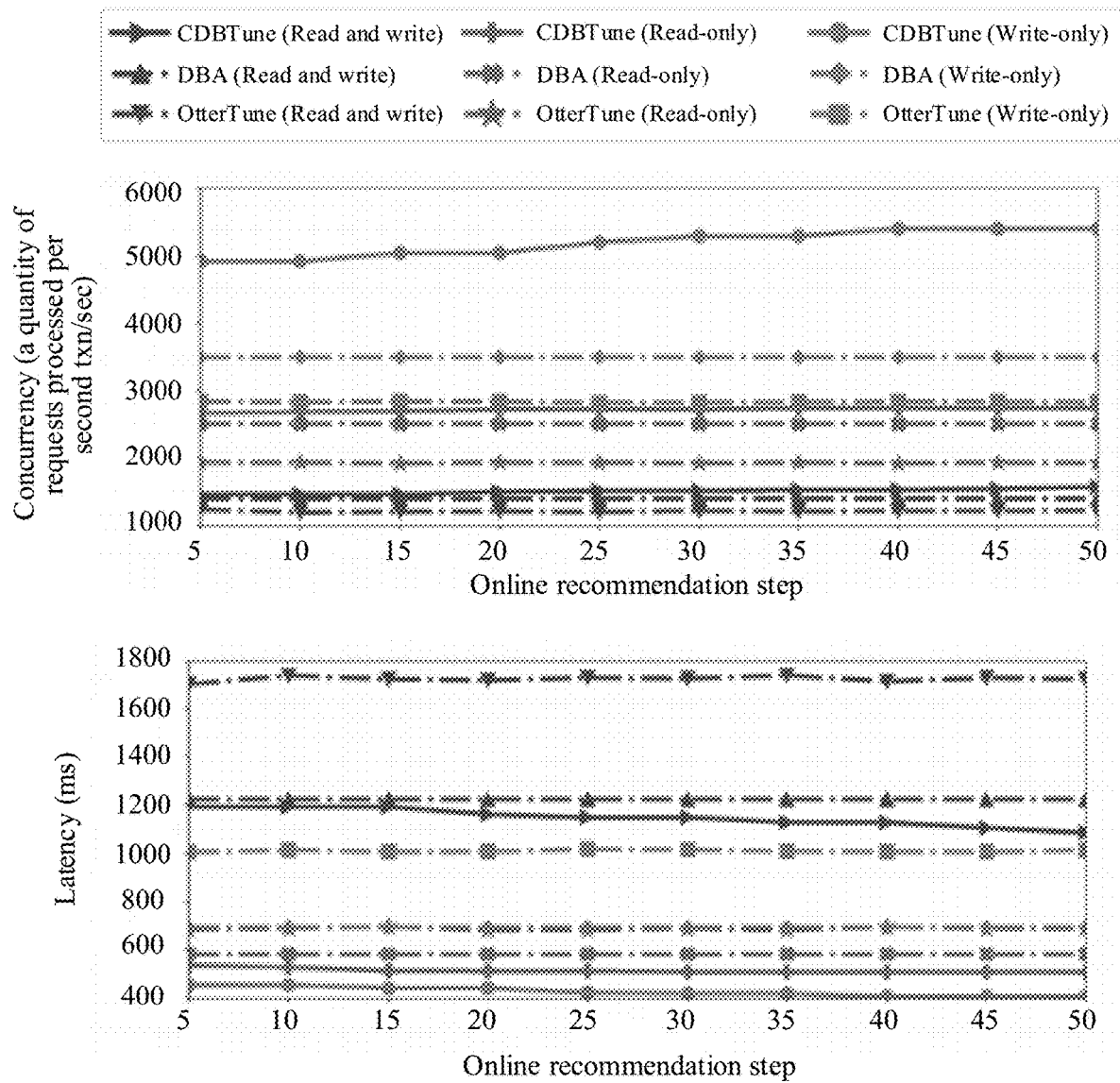
FIG. 7 to FIG. 13 are schematic diagrams of several groups of experimental data according to some embodiments of the present disclosure.

(2) Impact of different online recommendation steps on a recommendation result: Impact of different online recommendation steps performed on recommended configuration parameters provided by CDBTune, DBA, and OtterTune on database performance are separately compared by using three loads (read-only, write-only, and read and write) generated by Sysbench (a database function and performance testing tool). Experimental results are shown in FIG. 7. It is clearly observed from FIG. 7 that with the increase of the online recommendation steps, fine tuning performed by CDBTune on a model gradually adapts to a current working service load, thereby continuously improving performance. However, the database performance (concurrency and latency) recommended by OtterTune and DBA is basically not greatly improved. It indicates that CDBTune has high efficiency. Therefore, it is believed that CDBTune has indeed learned knowledge from past experience and performed well. Certainly, it may be observed from FIG. 7 that if a longer tuning time (more online recommendation steps) is received, a user obtains a better configuration to implement higher performance. However, OtterTune basically remains stable as a quantity of iterations increases, which is caused by the characteristics of supervised learning and a regression method.

2. Effectiveness Comparison

There are a total of 266 tunable configuration parameters in CDB obtained through sorting, and related experiment is performed on a real CDB instance.

Figure 8:
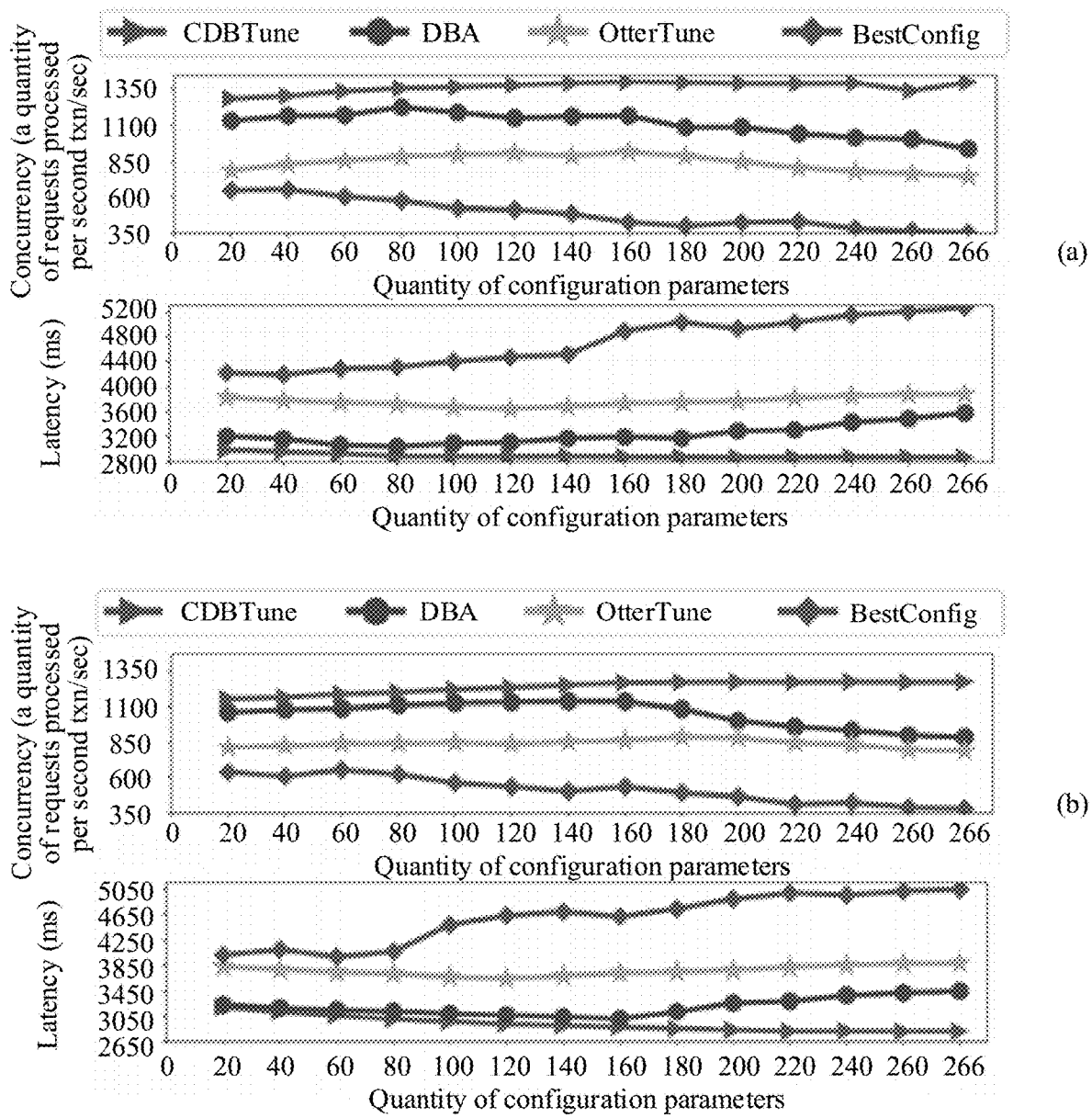

(1) To-be-tuned configuration parameter selected by DBA or OtterTune: The part (a) in FIG. 8 shows experimental data measured based on a ranking result of the importance of the to-be-tuned configuration parameters provided by DBA, and the part (b) in FIG. 8 shows experimental data measured based on a ranking result of the importance of the to-be-tuned configuration parameters provided by OtterTune. A horizontal coordinate represents a quantity of tunable configuration parameters. FIG. 8 shows a change curve of concurrency and latency of the database appearing as the quantity of tunable configuration parameters gradually increases. It can be seen from the two figures that CDBTune has adequate performance in all cases, and the performance of DBA and OtterTune starts to degrade when the quantity of configuration parameters reaches a particular level. The reason for this result is that DBA and OtterTune cannot find an appropriate combination in such a high-dimensional space due to a dependency relationship between a plurality of parameters.

(2) CDBTune Randomly Selects the To-Be-Tuned Configuration Parameter

Figure 9:
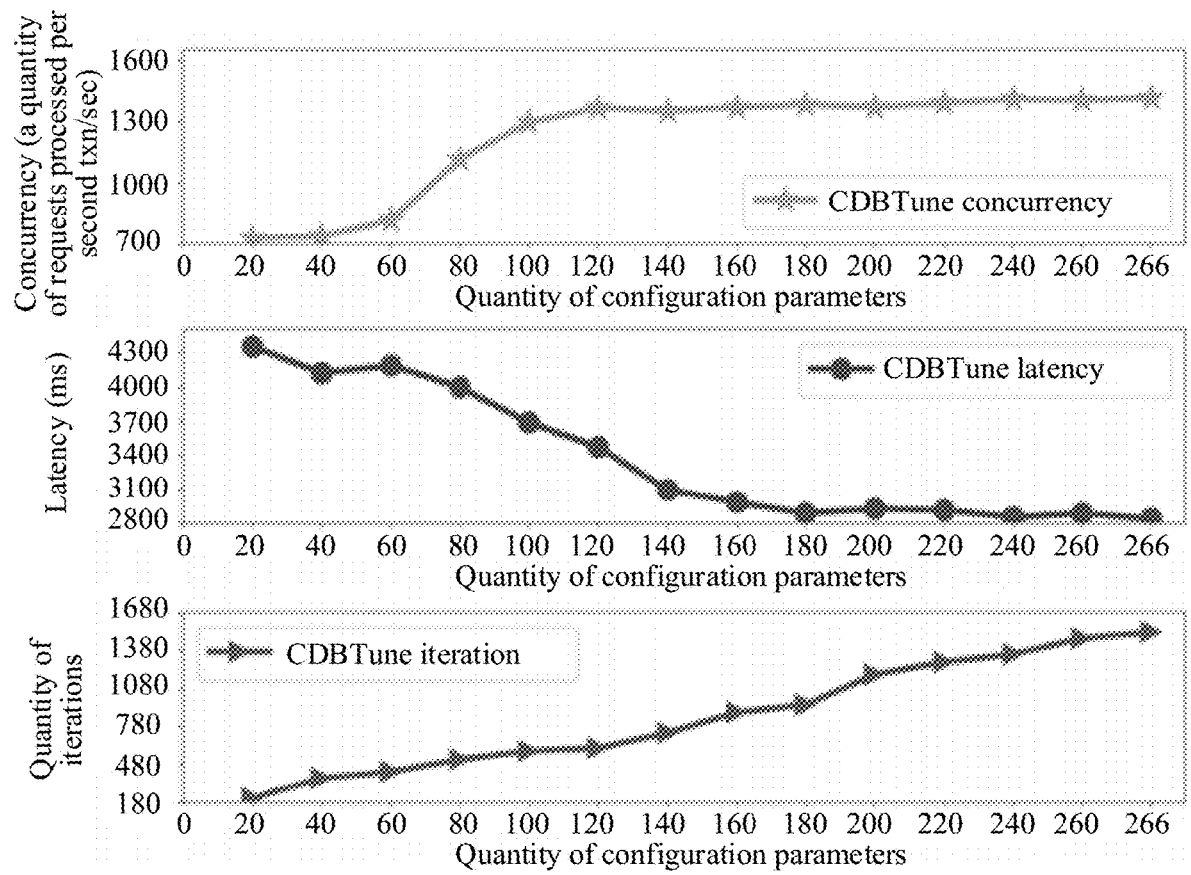

CDBTune randomly selects different quantities of to-be-tuned configuration parameters. When 40 parameters are selected, selected 20 parameters are definitely included. In this case, performance of CDB under a TPC-C load is recorded. FIG. 9 shows a change process of concurrency and latency of a database along with a quantity of iterations during model convergence. It can be seen that with the increase of the quantity of configuration parameters, the database performance corresponding to the recommended configuration parameter provided by CDBTune is continuously improved. In addition, the quantity of iterations required for a model to reach convergence also increases to a particular extent. This is mainly because a scale of a neural network becomes larger, a quantity of parameters increases, and convergence becomes more difficult. In addition, it also indicates that CDBTune does not require additional steps to sort the importance of configuration parameters like DBA and OtterTune. CDBTune automatically completes this process (feature extraction) by using a deep neural network, which also conforms to an original design intention of the present disclosure.

3. Performance Improvement

Figure 10:
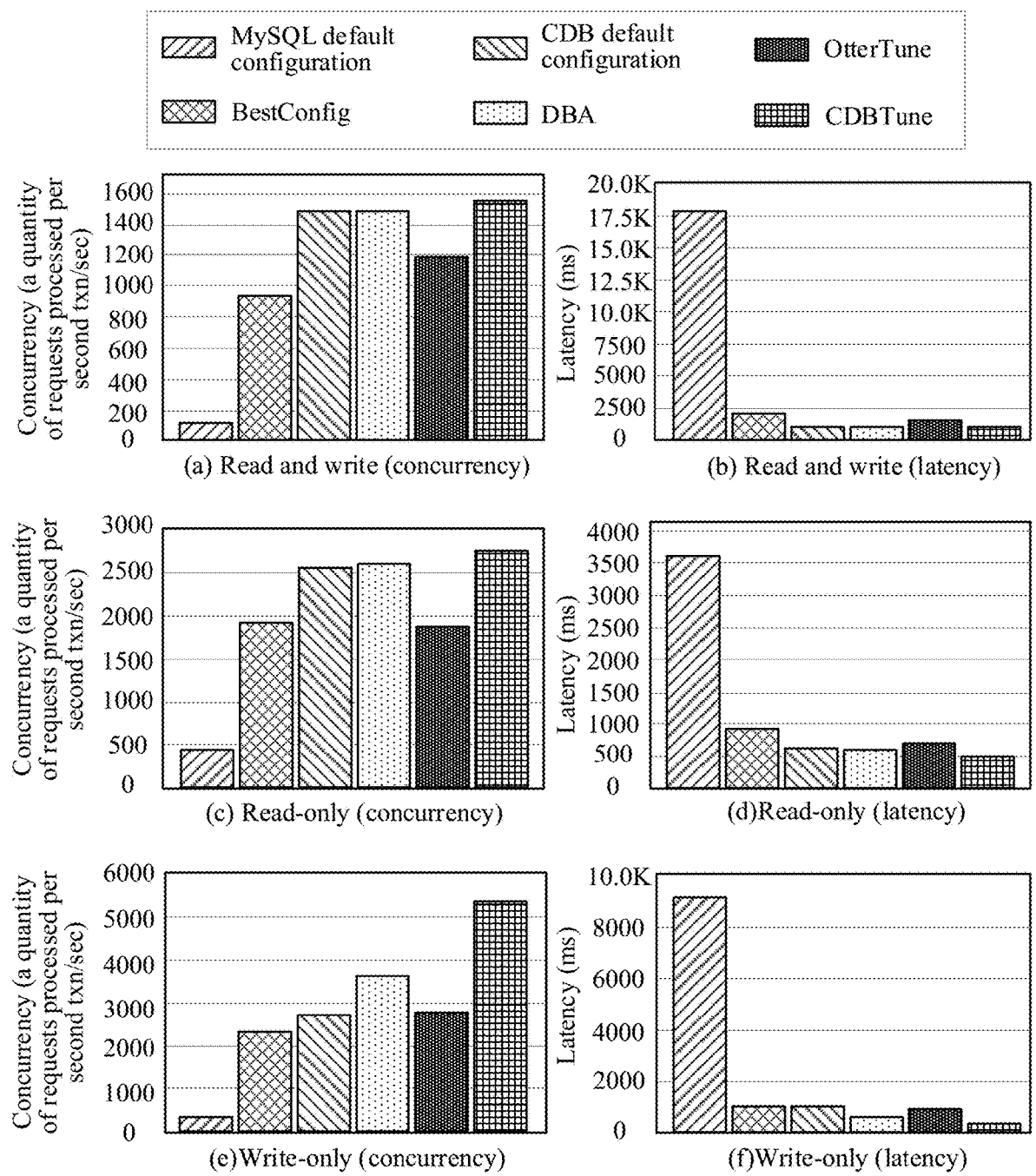

In a fair environment, database performance corresponding to default configurations of CDBTune and MySQL, a default configuration of CDB, and recommended configuration parameters provided by OtterTune, BestConfig, and DBA is compared by using the three load types of read-only, write-only, and read and write of Sysbench. It can be seen from FIG. 10 that CDBTune has the best performance in terms of concurrency and latency.

4. Performance Improvement on Other Types of Databases

Figure 11:
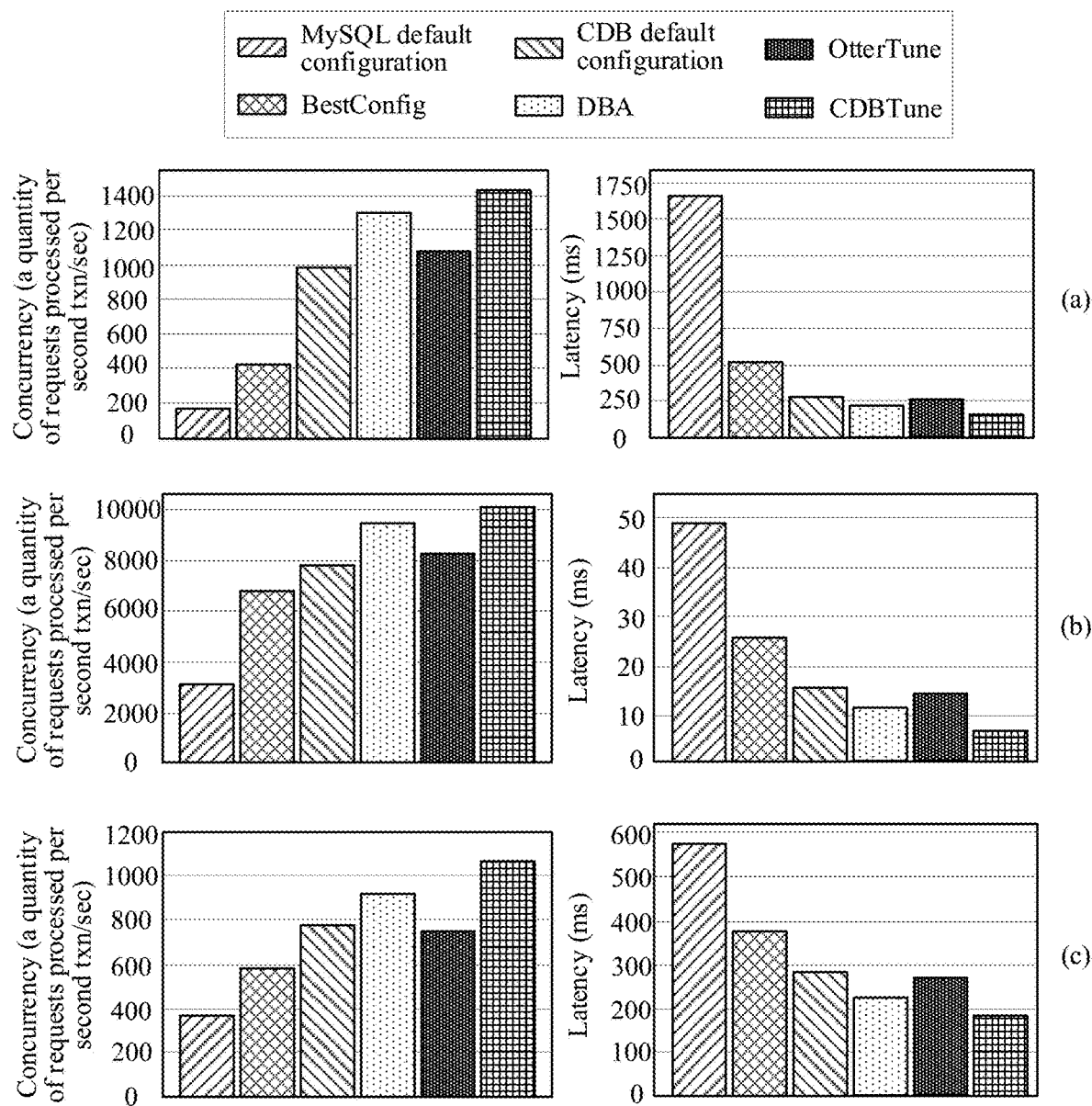

In addition to CDB, corresponding experiments are performed on other types of databases such as local MySQL, MongoDB, and Postgres by using different loads, and the same result is obtained. The experimental results are shown in FIG. 11 below, and CDBTune shows higher concurrency and minimum latency. In FIG. 11, three parts (a), (b), and (c) respectively represent experimental data on three different loads.

5. Adaptability of a Model (1) Adaptability of a Model on a Memory Size and a Disk Size Compared with a local self-built database, a CDB has a big advantage of considerable scalability. Generally, with the increasing requirements of users' services, the memory size and the disk size are two characteristics that are often tuned by the users during use. Therefore, after the memory size or the disk size is tuned by the users, it is impossible for CDBTune to correspondingly retrain models. Therefore, in a cloud environment, CDBTune is expected to have particular adaptability. Therefore, when the memory size and the disk size of the user change, the deep reinforcement learning model is not retrained for configuration recommendation, and the obtained experimental results are shown in FIG. 12.

Figure 12:
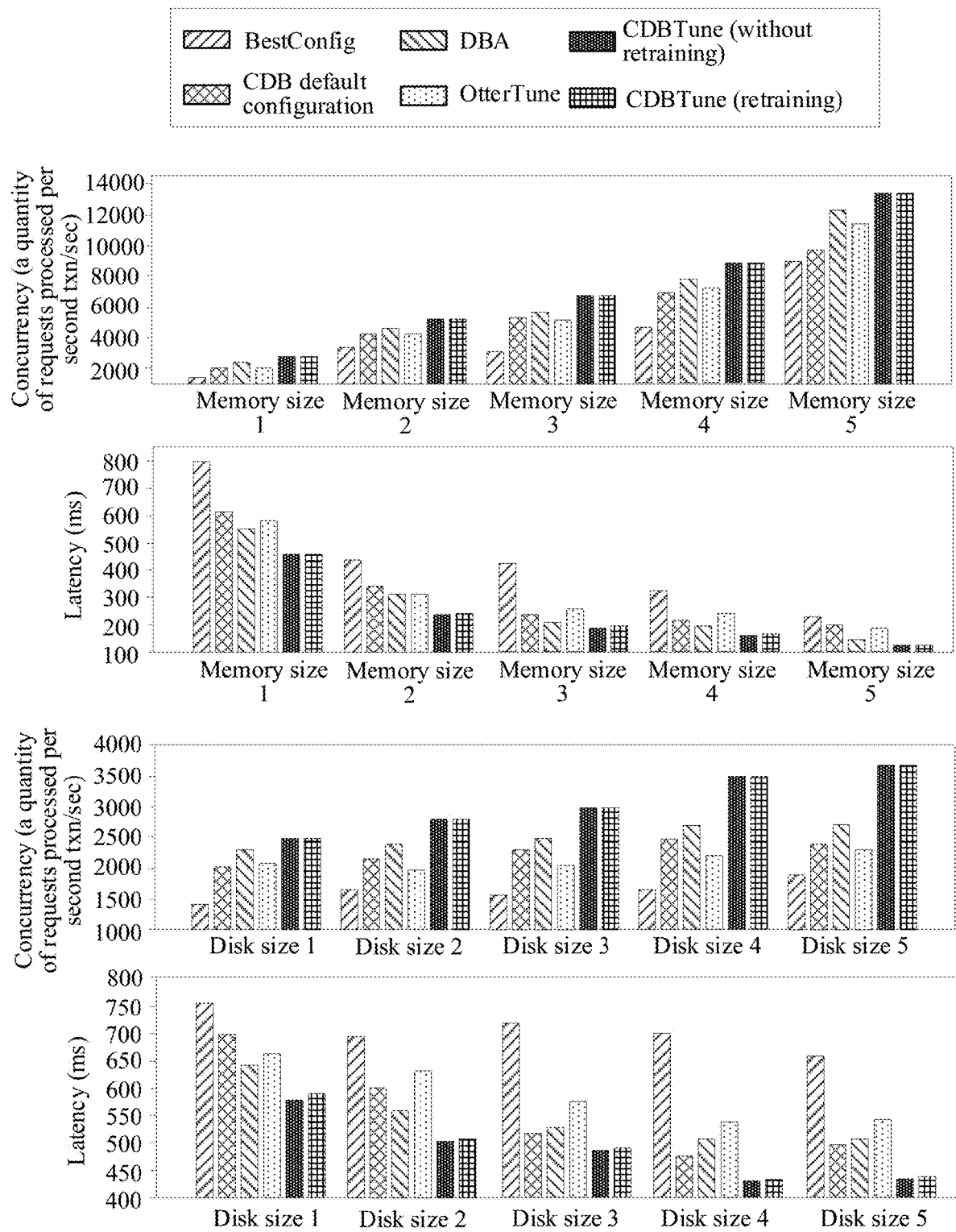

It can be seen from the experimental results shown in FIG. 12 that when the memory size or the disk size of the user changes, a model of CDBTune can obtain basically the same performance as a retrained model without retraining. It can be seen from this that the model of CDBTune has adequate adaptability when a hardware environment changes to a particular extent.

(2) Adaptability of the Model when a Load Changes

Figure 13:
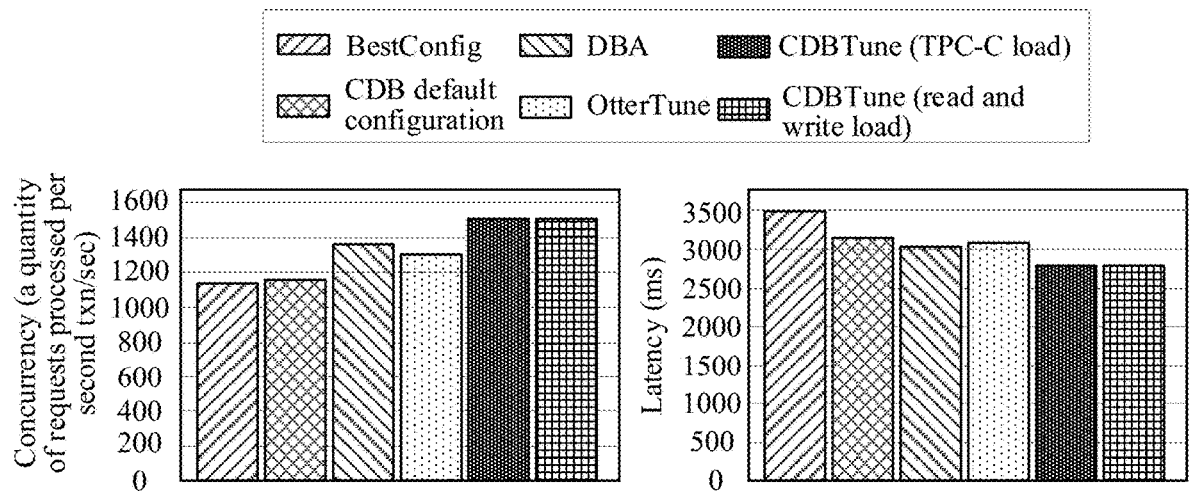

In addition to that the memory size and the disk size of the user change, to verify whether a change in a load also affects the adaptability of CDBTune, a configuration is recommended for the TPC-C load by using a model trained on the load of read and write of Sysbench, and the experimental result is shown in FIG. 13

The experimental result shown in FIG. 13 may show that when the load changes, the model of CDBTune has almost no difference in the database performance from the retrained model. This proves that CDBTune does not need to re-establish a new model when the load changes to a particular extent and has adequate adaptability.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in the present disclosure, execution of the steps is not strictly limited, and the steps may be performed in other sequences. In addition, at least some of the steps in the foregoing embodiments may include a plurality of substeps or a plurality of stages. These substeps or stages are not necessarily completed at the same moment, but may be performed at different moments. Besides, these substeps or stages may not be necessarily performed sequentially, but may be performed in turn or alternately with other steps or at least some of substeps or stages of other steps. The following describes system and apparatus embodiments of the present disclosure, which can be used for performing the method embodiments of the present disclosure. For details not disclosed in the system and apparatus embodiments of the present disclosure, refer to the method embodiments of the present disclosure.

An exemplary embodiment of the present disclosure further provides a database performance tuning system. As shown in FIG. 1, the system may include: a database system 10, a controller 20, and a tuning tool 30. The tuning tool 30 includes: an indicator collector 31, a deep reinforcement learning model 32, and a recommender 33.

The controller 20 is configured to: receive a performance tuning request corresponding to a target database in the database system 10, the performance tuning request being used for requesting to tune configuration parameters of the target database to optimize performance of the target database; and forward the performance tuning request to the tuning tool 30.

The tuning tool 30 is configured to: obtain a status indicator of the target database by using the indicator collector 31; output a recommended configuration parameter of the target database according to the status indicator of the target database by using the deep reinforcement learning model 32; and transmit the recommended configuration parameter of the target database to the controller 20 by using the recommender 33.

The controller 20 is further configured to apply the recommended configuration parameter of the target database to the target database.

The deep reinforcement learning model includes a first deep reinforcement learning network and a second deep reinforcement learning network, the first deep reinforcement learning network is used for providing a recommendation policy for outputting a recommended configuration parameter according to a status indicator, and the second deep reinforcement learning network is used for evaluating the recommendation policy provided by the first deep reinforcement learning network.

In summary, in the technical solution provided in the embodiments of the present disclosure, a recommended configuration parameter of a target database is outputted according to a status indicator of the target database by using a deep reinforcement learning model, and an end-to-end database performance tuning solution is provided. Problems of a poor recommended configuration parameter and a poor database performance tuning result caused by a machine learning pipeline method are overcome. The problems caused by a pipeline solution can be overcome because of the end-to-end solution, thereby improving the accuracy of the recommended configuration parameter and achieving a better performance tuning result of a database.

In an embodiment, an input parameter of the first deep reinforcement learning network includes the status indicator, and an output parameter of the first deep reinforcement learning network includes the recommended configuration parameter.

An input parameter of the second deep reinforcement learning network includes the input parameter and the output parameter of the first deep reinforcement learning network, an output parameter of the second deep reinforcement learning network includes a score value, and the score value is used for evaluating the recommendation policy provided by the first deep reinforcement learning network.

In an embodiment, the tuning tool 30 is further configured to:
invoke a standard deep reinforcement learning model, the standard deep reinforcement learning model being trained with standard database instances; and
retrain the standard deep reinforcement learning model, to obtain a tuned deep reinforcement learning model, the tuned deep reinforcement learning model being used for providing the recommended configuration parameter of the target database.

In an embodiment, the tuning tool 30 is configured to:
replay an actual workload of the target database by using a load generator 34;

perform at least one round of retraining process on the standard deep reinforcement learning model in a process of running the target database according to the actual workload; and stop training the standard deep reinforcement learning model when the standard deep reinforcement learning model meets a training stop condition, to obtain the tuned deep reinforcement learning model.

In an embodiment, the deep reinforcement learning model includes a first deep reinforcement learning network and a second deep reinforcement learning network.

The tuning tool 30 is configured to:

obtain an $i^{th}$ round of status indicator of the target database by using the indicator collector 31 in an $i^{th}$ round of retraining process, i being a positive integer;

input the $i^{th}$ round of status indicator into the first deep reinforcement learning network, and output an $i^{th}$ round of recommended configuration parameter of the target database;

apply the $i^{th}$ round of recommended configuration parameter to the target database;

input the $i^{th}$ round of status indicator and the $i^{th}$ round of recommended configuration parameter into the second deep reinforcement learning network, and output the score value corresponding to the first deep reinforcement learning network; and tune a parameter of the first deep reinforcement learning network according to the score value, to increase a reward value corresponding to the first deep reinforcement learning network, the reward value being used for indicating a difference between performance of the target database before the $i^{th}$ round of recommended configuration parameter is applied and performance of the target database after the $i^{th}$ round of recommended configuration parameter is applied.

Figure 14:
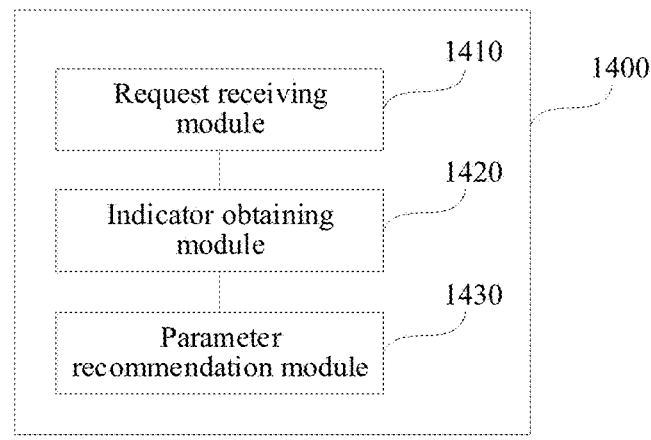
FIG. 14 is a block diagram of a database performance tuning apparatus according to an embodiment of the present disclosure.

FIG. 14 is a block diagram of a database performance tuning apparatus according to an embodiment of the present disclosure. The apparatus has functional modules or units for implementing the method examples, and each functional module or unit may be implemented entirely or partly by software, hardware, or a combination thereof. The apparatus may be a computer device or may be disposed in a computer device. The apparatus 1400 may include: a request receiving module 1410, an indicator obtaining module 1420, and a parameter recommendation module 1430.

The request receiving module 1410 is configured to receive a performance tuning request corresponding to a target database, the performance tuning request being used for requesting to tune configuration parameters of the target database to optimize performance of the target database.

The indicator obtaining module 1420 is configured to obtain a status indicator of the target database.

The parameter recommendation module 1430 is configured to: input the status indicator of the target database into a deep reinforcement learning model, and output a recommended configuration parameter of the target database, the deep reinforcement learning model including a first deep reinforcement learning network and a second deep reinforcement learning network, the first deep reinforcement learning network being used for providing a recommendation policy for outputting a recommended configuration parameter according to a status indicator, the second deep reinforcement learning network being used for evaluating the recommendation policy provided by the first deep reinforcement learning network.

In summary, in the technical solution provided in the embodiments of the present disclosure, a recommended configuration parameter of a target database is outputted according to a status indicator of the target database by using a deep reinforcement learning model, and an end-to-end database performance tuning solution is provided. Problems of a poor recommended configuration parameter and a poor database performance tuning result caused by a machine learning pipeline method are overcome. The problems caused by a pipeline solution can be overcome because of the end-to-end solution, thereby improving the accuracy of the recommended configuration parameter and achieving a better performance tuning result of a database.

In an embodiment, an input parameter of the first deep reinforcement learning network includes the status indicator, and an output parameter of the first deep reinforcement learning network includes the recommended configuration parameter.

An input parameter of the second deep reinforcement learning network includes the input parameter and the output parameter of the first deep reinforcement learning network, an output parameter of the second deep reinforcement learning network includes a score value, and the score value is used for evaluating the recommendation policy provided by the first deep reinforcement learning network.

Figure 15:
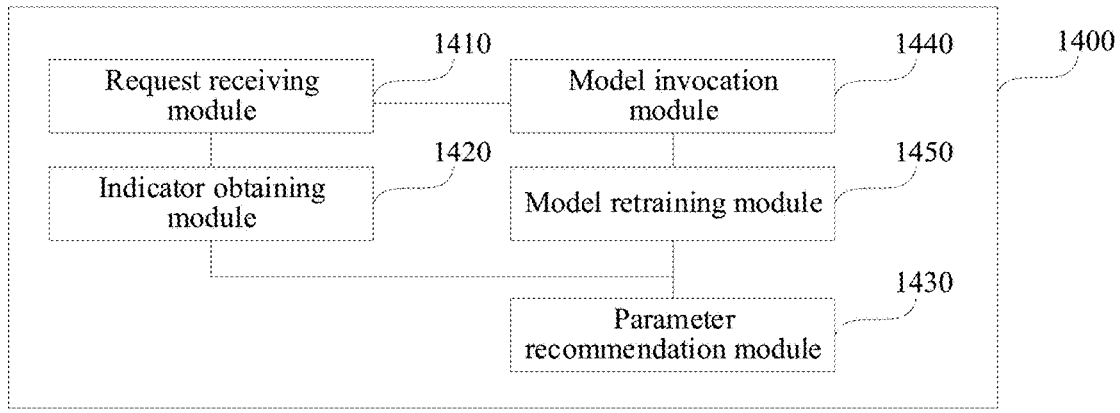
FIG. 15 is a block diagram of a database performance tuning apparatus according to another embodiment of the present disclosure.

In an embodiment, as shown in FIG. 15, the apparatus 1400 further includes a model invocation module 1440 and a model retraining module 1450.

The model invocation module 1440 is configured to invoke a standard deep reinforcement learning model, the standard deep reinforcement learning model being trained with standard database instances.

The model retraining module 1450 is configured to retrain the standard deep reinforcement learning model, to obtain a tuned deep reinforcement learning model, the tuned deep reinforcement learning model being used for providing the recommended configuration parameter of the target database.

In an embodiment, the model retraining module 1450 is configured to:

replay an actual workload of the target database;

perform at least one round of retraining process on the standard deep reinforcement learning model in a process of running the target database according to the actual workload; and stop training the standard deep reinforcement learning model when the standard deep reinforcement learning model meets a training stop condition, to obtain the tuned deep reinforcement learning model.

In an embodiment, the deep reinforcement learning model includes a first deep reinforcement learning network and a second deep reinforcement learning network.

The model retraining module 1450 is configured to:

obtain an $i^{th}$ round of status indicator of the target database in an $i^{th}$ round of retraining process, i being a positive integer;

input the $i^{th}$ round of status indicator into the first deep reinforcement learning network, and output an $i^{th}$ round of recommended configuration parameter of the target database;

apply the $i^{th}$ round of recommended configuration parameter to the target database;

input the $i^{th}$ round of status indicator and the $i^{th}$ round of recommended configuration parameter into the second deep reinforcement learning network, and output the score value corresponding to the first deep reinforcement learning network; and tune a parameter of the first deep reinforcement learning network according to the score value, to increase a reward value corresponding to the first deep reinforcement learning network, the reward value being used for indicating a difference between performance of the target database before the $i^{th}$ round of recommended configuration parameter is applied and performance of the target database after the $i^{th}$ round of recommended configuration parameter is applied.

When the apparatus provided in the foregoing embodiments implements functions of the apparatus, it is illustrated with an example of division of each functional module. In the practical application, the function distribution may be finished by different functional modules according to the requirements, that is, the internal structure of the device is divided into different functional modules, to implement all or some of the functions described above. In addition, the apparatus and method embodiments provided in the foregoing embodiments belong to one conception. For the specific implementation process, reference may be made to the method embodiments, and details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 16:
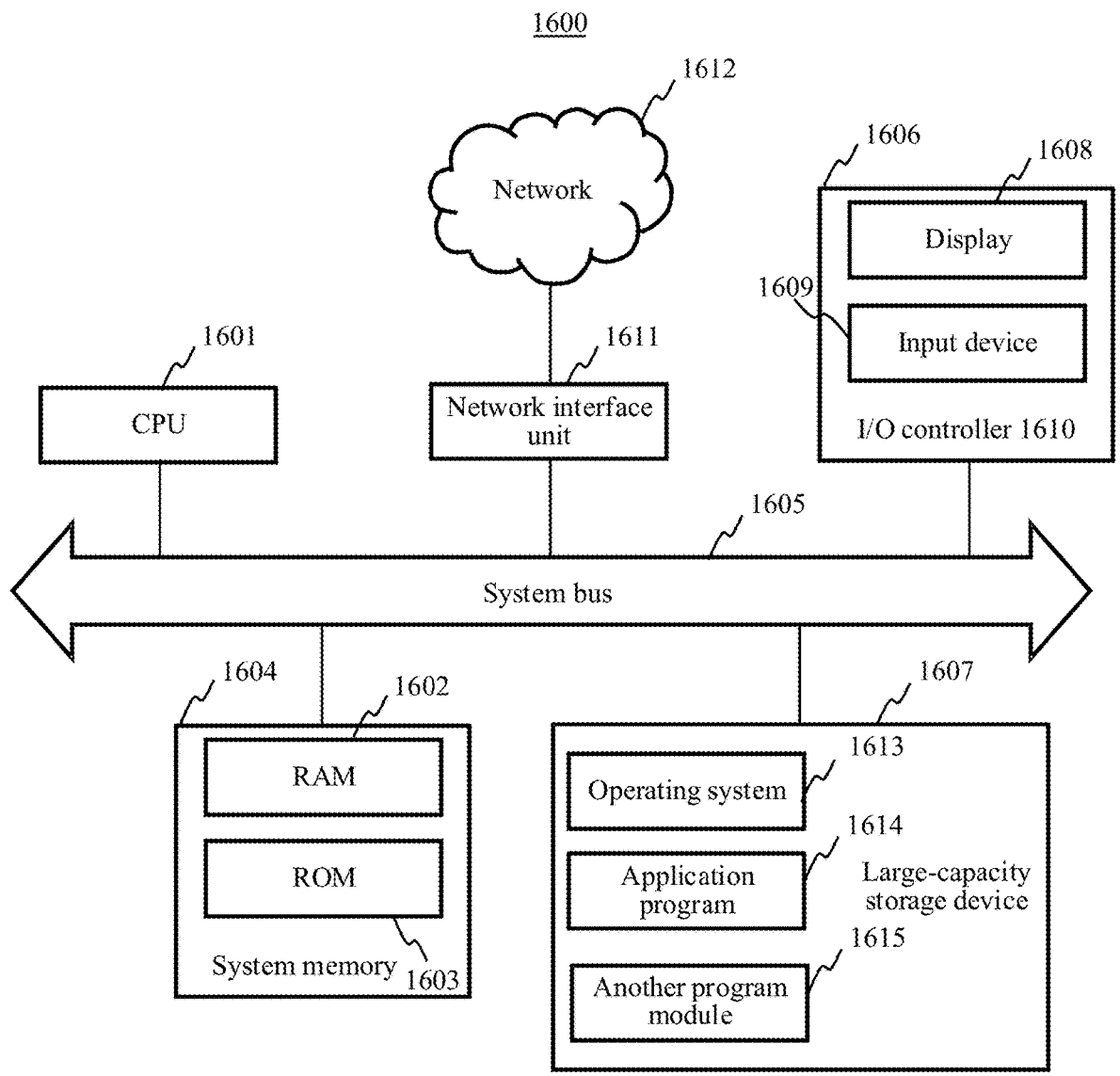
FIG. 16 is a schematic structural diagram of a computer device according to an embodiment of the present disclosure.

FIG. 16 is a schematic structural diagram of a computer device according to an embodiment of the present disclosure. The computer device may be any electronic device with a data processing function and a data storage function, for example, a personal computer (PC) or a server. The computer device is configured to implement the database performance optimization method provided in the foregoing embodiments.

Specifically, the computer device 1600 includes a central processing unit (CPU) 1601, a system memory 1604 including a random access memory (RAM) 1602 and a read-only memory (ROM) 1603, and a system bus 1605 connecting the system memory 1604 and the CPU 1601. The computer device 1600 further includes a basic I/O system 1606 assisting in transmitting information between components in the computer, and a large-capacity storage device 1607 configured to store an operating system 1613, an application program 1614, and another program module 1615.

The basic I/O system 1606 includes a display 1608 configured to display information and an input device 1609 such as a mouse or a keyboard configured to input information by a user. The display 1608 and the input device 1609 are both connected to the CPU 1601 by using an I/O controller 1610 that is connected to the system bus 1605. The basic I/O system 1606 may further include the I/O controller 1610 configured to receive and process input from a plurality of other devices such as a keyboard, a mouse, or an electronic stylus. Similarly, the I/O controller 1610 further provides an output to a display screen, a printer, or another type of output device.

The mass storage device 1607 is connected to the CPU 1601 by using a mass storage controller (not shown) connected to the system bus 1605. The large-capacity storage device 1607 and a computer-readable medium associated with the large-capacity storage device provide non-volatile storage to the computer device 1600. That is, the large-capacity storage device 1607 may include the computer-readable medium (not shown) such as a hard disk or a CD-ROM driver.

In general, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an EPROM, an EEPROM, a flash memory or another solid-state storage technology, a CD-ROM, a DVD or another optical storage, a magnetic cassette, a magnetic tape, or a magnetic disk storage or another magnetic storage device. Certainly, a person skilled in the art may know that the computer storage medium is not limited to the foregoing types. The system memory 1604 and the mass storage device 1607 may be collectively referred to as a memory.

According to the embodiments of the present disclosure, the computer device 1600 may further be connected, through a network such as the Internet, to a remote computer on the network and run. That is, the computer device 1600 may be connected to a network 1612 by using a network interface unit 1611 connected to the system bus 1605, or may be connected to another type of network or a remote computer system (not shown) by using a network interface unit 1611.

The memory stores at least one computer-readable instruction, at least one program, a code set, or a computer-readable instruction set, and the at least one computer-readable instruction, the at least one program, the code set, or the computer-readable instruction set is configured to be executed by one or more processors to implement the database performance tuning method provided in the foregoing embodiments.

In an exemplary embodiment, one or more computer-readable storage media are further provided, storing at least one computer-readable instruction, at least one program, a code set, or a computer-readable instruction set, the at least one computer-readable instruction, the at least one program, the code set, or the computer-readable instruction set, when executed by one or more processors in the computer device, implementing the database performance tuning method provided in the foregoing embodiments. In an exemplary embodiment, the computer-readable storage medium may be a ROM, a RAM, a CD-ROM, a magnetic tape, a floppy disk, an optical data storage device.

In an exemplary embodiment, a computer program product is further provided, when executed, the computer program product is used for implementing the database performance tuning method provided in the foregoing embodiments.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the present disclosure.

What is claimed is:

1. A database performance tuning method, performed by a computer device, the method comprising:
   receiving a performance tuning request of tuning a configuration parameter of a target database, the target database being a cloud database of a cloud service provider;
   invoking a standard deep reinforcement learning model, the standard deep reinforcement learning model being trained with standard database instances and comprising a first deep reinforcement learning network and a second deep reinforcement learning network, the first deep reinforcement learning network being configured to provide a recommendation policy for outputting a recommended configuration parameter according to a status indicator, the second deep reinforcement learning network being configured to evaluate the recommendation policy provided by the first deep reinforcement learning network;
   replaying an actual workload of the target database by: returning, by a load generator, the target database to a state at a previous timestamp; and re-executing a plurality of operations logged in an operation execution record of the target database within a historical time starting from the previous timestamp according to a same execution sequence logged in the operation execution record;
   performing at least one round of retraining process on the standard deep reinforcement learning model in a process of running the target database according to the actual workload;
   stopping retraining the standard deep reinforcement learning model when a training stop condition is met, to obtain the tuned deep reinforcement learning model;
   obtaining a status indicator of the target database; and
   inputting the status indicator of the target database into the tuned deep reinforcement learning model, to obtain a recommended configuration parameter of the target database,
   wherein the target database tuned based on the recommended configuration parameter has a higher concurrency and a lower latency compared to the target database before tuning, the concurrency indicating a quantity of requests processed by the target database per unit time.

2. The method according to claim 1, wherein an input parameter of the first deep reinforcement learning network comprises the status indicator, and an output parameter of the first deep reinforcement learning network comprises the recommended configuration parameter; and an input parameter of the second deep reinforcement learning network comprises the input parameter and the output parameter of the first deep reinforcement learning network, an output parameter of the second deep reinforcement learning network comprises a score value, and the score value is used for evaluating the recommendation policy provided by the first deep reinforcement learning network and adjusting the first deep reinforcement learning network.

3. The method according to claim 1, wherein the performing at least one round of retraining process on the standard deep reinforcement learning model comprises:
   obtaining an $i^{th}$ round of status indicator of the target database in an $i^{th}$ round of retraining process, i being a positive integer;
   inputting the $i^{th}$ round of status indicator into the first deep reinforcement learning network, and outputting an $i^{th}$ round of recommended configuration parameter of the target database;
   applying the $i^{th}$ round of recommended configuration parameter to the target database;
   inputting the $i^{th}$ round of status indicator and the $i^{th}$ round of recommended configuration parameter into the second deep reinforcement learning network, and outputting the score value corresponding to the first deep reinforcement learning network; and
   tuning a parameter of the first deep reinforcement learning network according to the score value, to increase a reward value corresponding to the first deep reinforcement learning network, the reward value indicating a difference between performance of the target database before the $i^{th}$ round of recommended configuration parameter is applied and performance of the target database after the $i^{th}$ round of recommended configuration parameter is applied.

4. The method according to claim 1, further comprising:
   applying the recommended configuration parameter of the target database to the target database.

5. A computer device, comprising one or more processors and a memory, the memory storing at least one computer-readable instruction, at least one program, a code set, or a computer-readable instruction set, the at least one computer-readable instruction, the at least one program, the code set, or the computer-readable instruction set being loaded and executed by the one or more processors to implement a plurality of operations comprising:
   receiving a performance tuning request of tuning a configuration parameter of a target database, the target database being a cloud database of a cloud service provider;
   invoking a standard deep reinforcement learning model, the standard deep reinforcement learning model being trained with standard database instances and comprising a first deep reinforcement learning network and a second deep reinforcement learning network, the first deep reinforcement learning network being configured to provide a recommendation policy for outputting a recommended configuration parameter according to a status indicator, the second deep reinforcement learning network being configured to evaluate the recommendation policy provided by the first deep reinforcement learning network;
   replaying an actual workload of the target database by: returning, by a load generator, the target database to a state at a previous timestamp; and re-executing a plurality of operations logged in an operation execution record of the target database within a historical time starting from the previous timestamp according to a same execution sequence logged in the operation execution record;
   performing at least one round of retraining process on the standard deep reinforcement learning model in a process of running the target database according to the actual workload;
   stopping retraining the standard deep reinforcement learning model when a training stop condition is met, to obtain the tuned deep reinforcement learning model;
   obtaining a status indicator of the target database; and
   inputting the status indicator of the target database into the tuned deep reinforcement learning model, to obtain a recommended configuration parameter of the target database, wherein the target database tuned based on the recommended configuration parameter has a higher concurrency and a lower latency compared to the target database before tuning, the concurrency indicating a quantity of requests processed by the target database per unit time.

6. The device according to claim 5, wherein an input parameter of the first deep reinforcement learning network comprises the status indicator, and an output parameter of the first deep reinforcement learning network comprises the recommended configuration parameter; and an input parameter of the second deep reinforcement learning network comprises the input parameter and the output parameter of the first deep reinforcement learning network, an output parameter of the second deep reinforcement learning network comprises a score value, and the score value is used for evaluating the recommendation policy provided by the first deep reinforcement learning network and adjusting the first deep reinforcement learning network.

7. The device according to claim 5, wherein the performing at least one round of retraining process on the standard deep reinforcement learning model comprises:
obtaining an $i^{th}$ round of status indicator of the target database in an $i^{th}$ round of retraining process, i being a positive integer;
inputting the $i^{th}$ round of status indicator into the first deep reinforcement learning network, and outputting an $i^{th}$ round of recommended configuration parameter of the target database;
applying the $i^{th}$ round of recommended configuration parameter to the target database;
inputting the $i^{th}$ round of status indicator and the $i^{th}$ round of recommended configuration parameter into the second deep reinforcement learning network, and outputting the score value corresponding to the first deep reinforcement learning network; and
tuning a parameter of the first deep reinforcement learning network according to the score value, to increase a reward value corresponding to the first deep reinforcement learning network, the reward value indicating a difference between performance of the target database before the $i^{th}$ round of recommended configuration parameter is applied and performance of the target database after the $i^{th}$ round of recommended configuration parameter is applied.

8. The device according to claim 5, wherein the plurality of operations further comprises:
applying the recommended configuration parameter of the target database to the target database.

9. A non-transitory computer-readable storage medium, storing at least one computer-readable instruction, at least one program, a code set, or a computer-readable instruction set, the at least one computer-readable instruction, the at least one program, the code set, or the computer-readable instruction set being loaded and executed by one or more processors to implement a plurality of operations comprising:
receiving a performance tuning request of tuning a configuration parameter of a target database, the target database being a cloud database of a cloud service provider;
invoking a standard deep reinforcement learning model, the standard deep reinforcement learning model being trained with standard database instances and comprising a first deep reinforcement learning network and a second deep reinforcement learning network, the first deep reinforcement learning network being configured to provide a recommendation policy for outputting a recommended configuration parameter according to a status indicator, the second deep reinforcement learning network being configured to evaluate the recommendation policy provided by the first deep reinforcement learning network;
replaying an actual workload of the target database by: returning, by a load generator, the target database to a state at a previous timestamp; and re-executing a plurality of operations logged in an operation execution record of the target database within a historical time starting from the previous timestamp according to a same execution sequence logged in the operation execution record;
performing at least one round of retraining process on the standard deep reinforcement learning model in a process of running the target database according to the actual workload;
stopping retraining the standard deep reinforcement learning model when a training stop condition is met, to obtain the tuned deep reinforcement learning model;
obtaining a status indicator of the target database; and
inputting the status indicator of the target database into the tuned deep reinforcement learning model, to obtain a recommended configuration parameter of the target database,
wherein the target database tuned based on the recommended configuration parameter has a higher concurrency and a lower latency compared to the target database before tuning, the concurrency indicating a quantity of requests processed by the target database per unit time.

10. The storage medium according to claim 9, wherein an input parameter of the first deep reinforcement learning network comprises the status indicator, and an output parameter of the first deep reinforcement learning network comprises the recommended configuration parameter; and an input parameter of the second deep reinforcement learning network comprises the input parameter and the output parameter of the first deep reinforcement learning network, an output parameter of the second deep reinforcement learning network comprises a score value, and the score value is used for evaluating the recommendation policy provided by the first deep reinforcement learning network and correcting the first deep reinforcement learning network.

11. The storage medium according to claim 9, wherein the performing at least one round of retraining process on the standard deep reinforcement learning model comprises:
obtaining an $i^{th}$ round of status indicator of the target database in an $i^{th}$ round of retraining process, i being a positive integer;
inputting the $i^{th}$ round of status indicator into the first deep reinforcement learning network, and outputting an $i^{th}$ round of recommended configuration parameter of the target database;
applying the $i^{th}$ round of recommended configuration parameter to the target database;
inputting the $i^{th}$ round of status indicator and the $i^{th}$ round of recommended configuration parameter into the second deep reinforcement learning network, and outputting the score value corresponding to the first deep reinforcement learning network; and
tuning a parameter of the first deep reinforcement learning network according to the score value, to increase a reward value corresponding to the first deep reinforcement learning network, the reward value indicating a difference between performance of the target database before the $i^{th}$ round of recommended configuration parameter is applied and performance of the target database after the $i^{th}$ round of recommended configuration parameter is applied.

12. The storage medium according to claim 9, wherein the plurality of operations further comprises:
applying the recommended configuration parameter of the target database to the target database.

13. The method according to claim 1, wherein:
the standard deep reinforcement learning model is trained offline for one time before receiving the performance tuning request; and
the at least one round of retraining process is performed online after receiving the performance tuning request.

* * * * *